Feb. 25, 1930.    A. R. LAFFERTY    1,748,720
AUTOMATIC PLATE EJECTOR
Filed April 30, 1928    7 Sheets-Sheet 1

INVENTOR
ARTHUR R. LAFFERTY
BY
ATTORNEYS

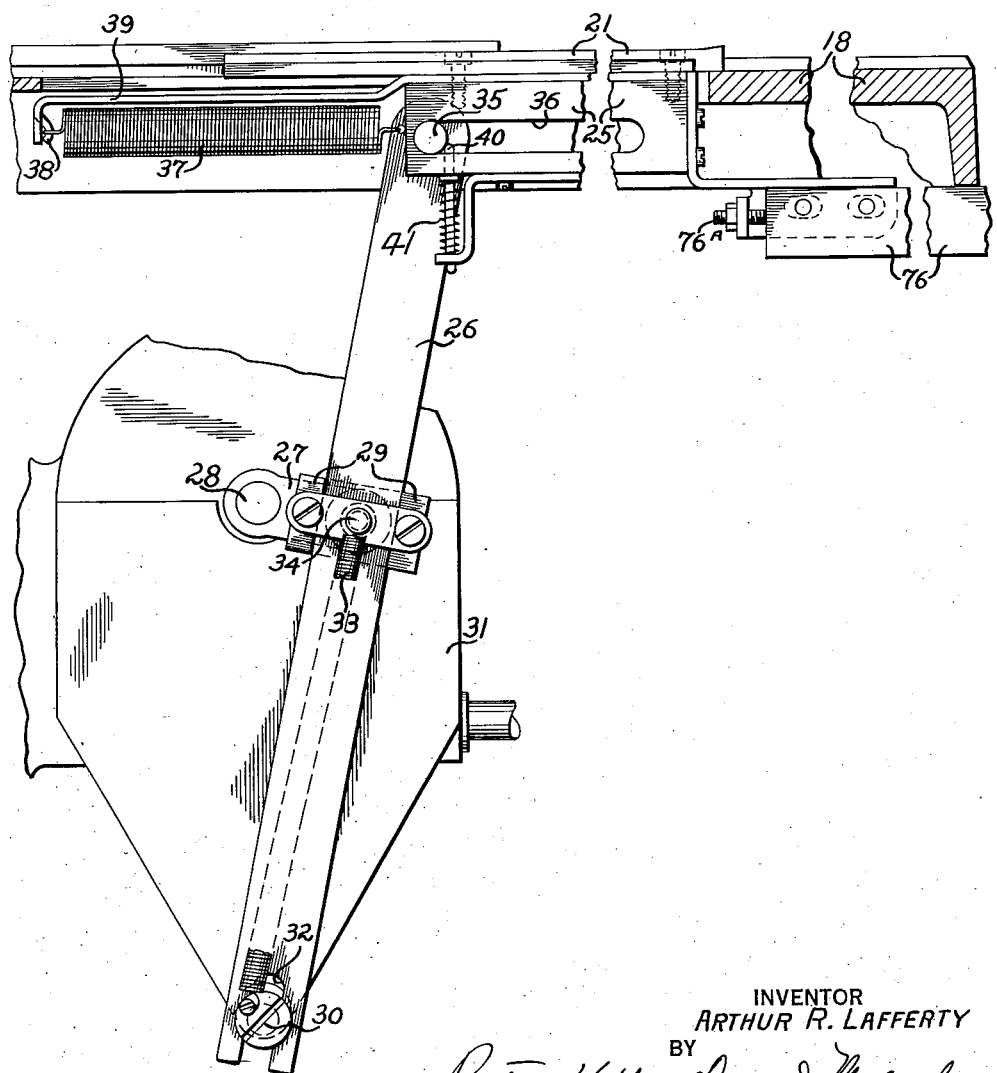

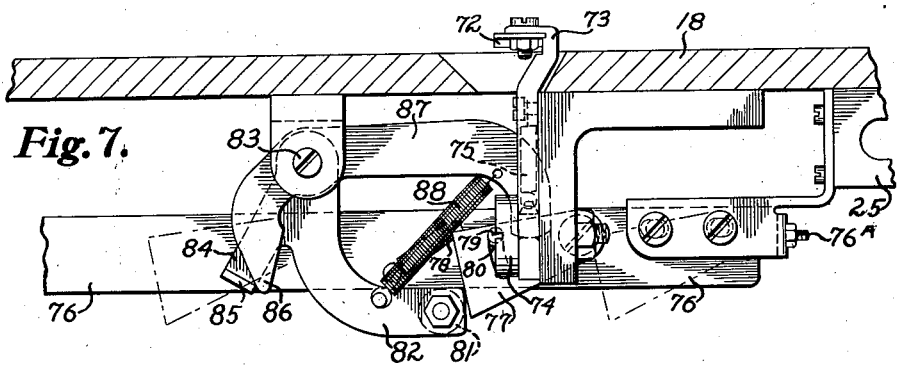
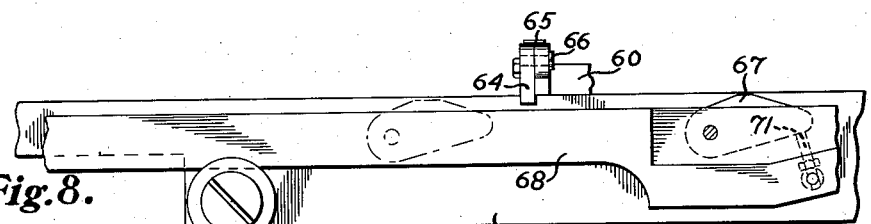
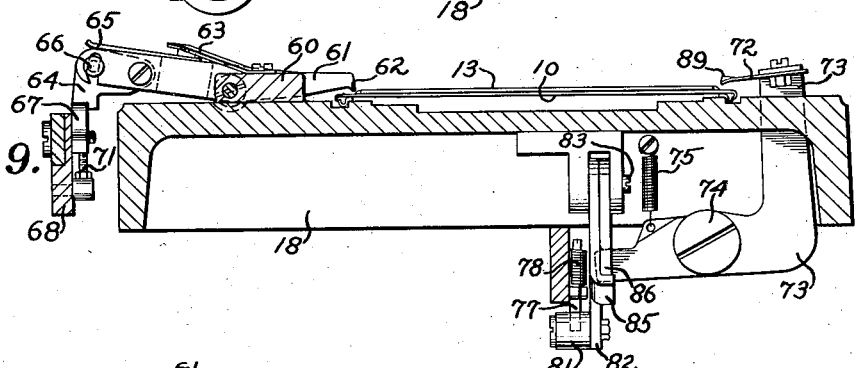
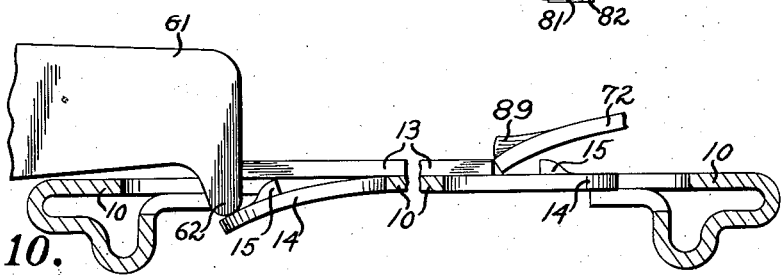

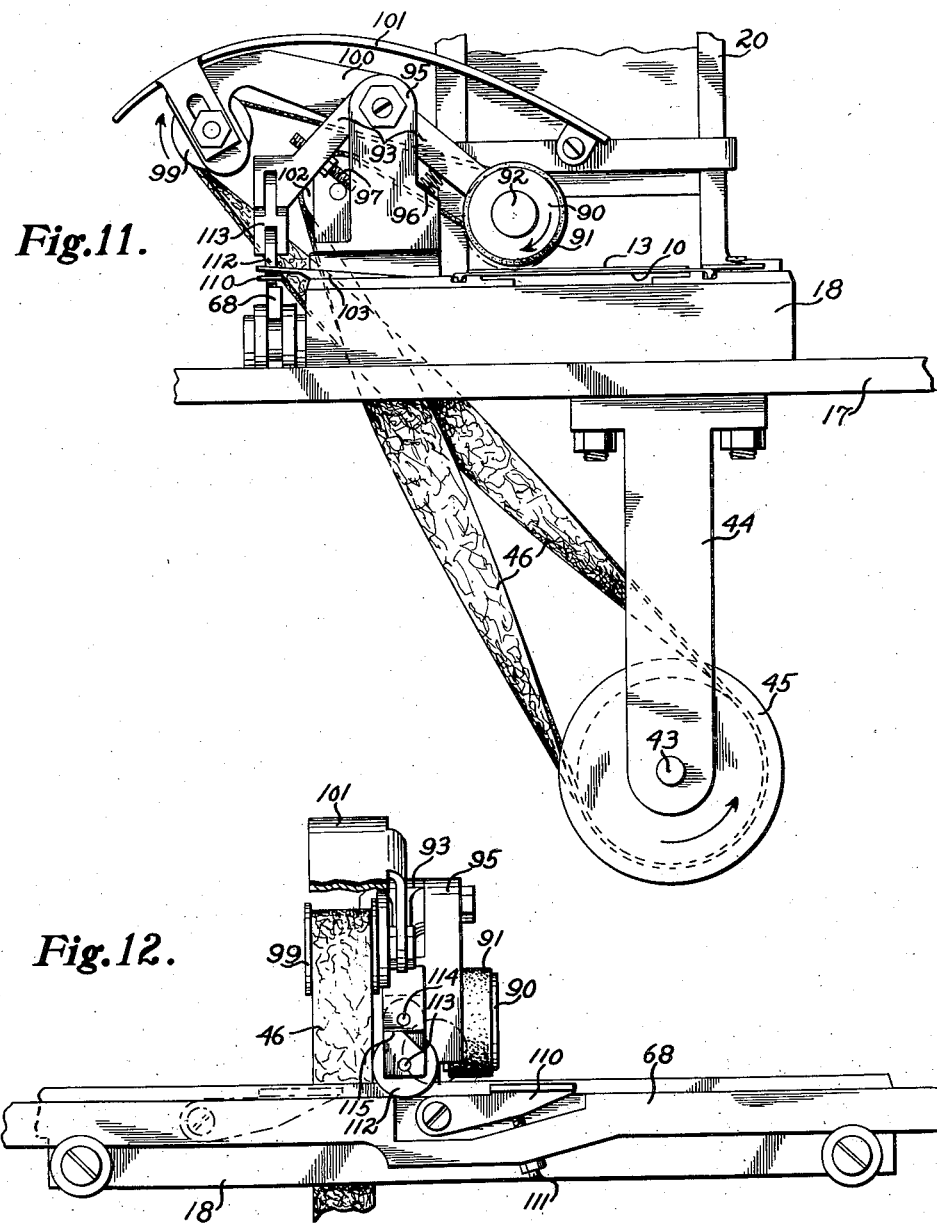

Patented Feb. 25, 1930

1,748,720

UNITED STATES PATENT OFFICE

ARTHUR R. LAFFERTY, OF DETROIT, MICHIGAN, ASSIGNOR TO BURROUGHS ADDING MACHINE COMPANY, OF DETROIT, MICHIGAN, A CORPORATION OF MICHIGAN

AUTOMATIC PLATE EJECTOR

Application filed April 30, 1928. Serial No. 273,918.

This invention relates to an automatic plate ejector for removing address plates from the frames or holders in which they are held when used in addressing machines.

Addressing machines are now quite commonly used for printing names and addresses on mailing matter, particularly where there is a large quantity of such matter to be handled. The name and address, together with such other data as is to be printed is embossed on a thin metal plate which is slidably inserted in a groove in a metal frame or holder where it is held against sliding out endwise by spring retaining tongues having lugs that project above the end edges of the plate. These holders are stacked in the addressing machine which feeds them automatically to printing position. After the printing has been done the holders are removed and filed away in cabinets that are usually provided for that purpose.

It is often necessary to discontinue some of the names from a mailing list, and, in certain large business organizations, these changes take place continually in considerable numbers. The practice has been to remove the holder containing the plate to be discarded and to then take the plate out of the holder by hand. This operation involves pressing down one of the spring tongues on the holder by hand and then pushing the plate out, also by hand. This is a tedious and slow process and it is an operation that is disliked by workers because of the frequency with which they cut their fingers on the edges of the plates and the disagreeable nature of the operation of pressing the tongues down. The present invention is directed to the provision of an automatic machine that will remove the old address plates from the holders without requiring any manual operations except stacking the holders in a machine and pressing a control lever for starting the machine, after which the plates will be automatically removed from the holders and the holders and plates discharged into separate receptacles.

Accordingly, the general object of the invention is to provide a machine for removing plates from the holders used in addressing machines.

A more particular object is to provide a machine of this character which will not only be entirely automatic, but one which will also be simple in construction and inexpensive to build.

Other objects and advantages of the invention will appear from the specification and drawings.

An embodiment of the invention is shown in the accompanying drawings in which;

Fig. 6 is a detailed side elevation of the general operating slide and the connections for driving it.

Fig. 7 is a partial section showing the mechanism for first partially removing a plate from its holder.

Fig. 8 is a detail side elevation of one of the cam slides for operating the mechanism for depressing the spring retaining tongue that holds the plate in place.

Fig. 9 is a section and side elevation showing the mechanism for depressing the spring retaining tongue and for partially ejecting the plate, the parts being in normal position.

Fig. 10 is an enlarged view illustrating how the plate is partially removed by the mechanism shown in Figs. 7, 8 and 9.

Fig. 11 is a partial end elevation showing the means for finally removing the plates, the parts being shown in normal position.

Fig. 12 is a partial side elevation of the cam for moving the mechanism of Fig. 11 to operating position.

Figure 1:
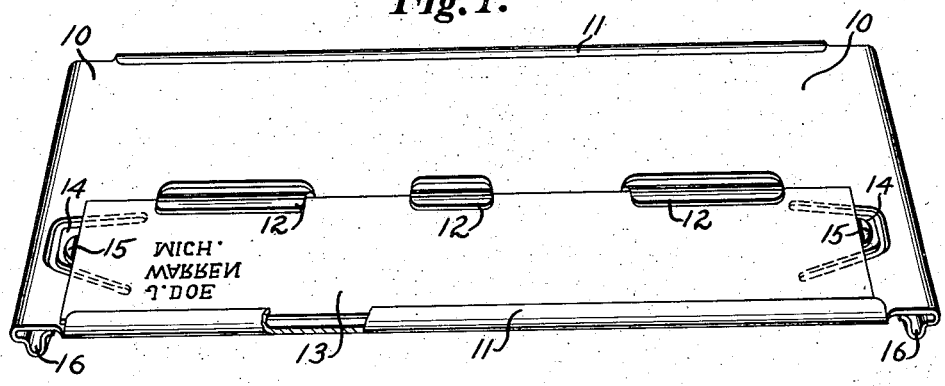
Figure 1 is a perspective view of one of the holders with an address plate in it.

The holders or frames that contain the address plates are illustrated in Fig. 1. Each holder comprises a flat metal stamping 10 having its side edges turned over at 11. Lugs 12 are struck from the plate in spaced relation from one of the side edges in these lugs are turned over so as to form with one of the turned over side edges 11 a slot or groove for reception of the plate 13 which may be slid into place from one end of the holder. After the address plate is slid endwise to the position illustrated, it is held by spring retaining tongues 14 having projecting portions or lugs 15 engaging over the ends of the plate. The plate is thus securely held in the holder, but it may be removed endwise by depressing one of the tongues and sliding the plate out over it. The holder has its ends turned over and shaped to form ribs 16 of which use is made as will be later described.

Figure 2:
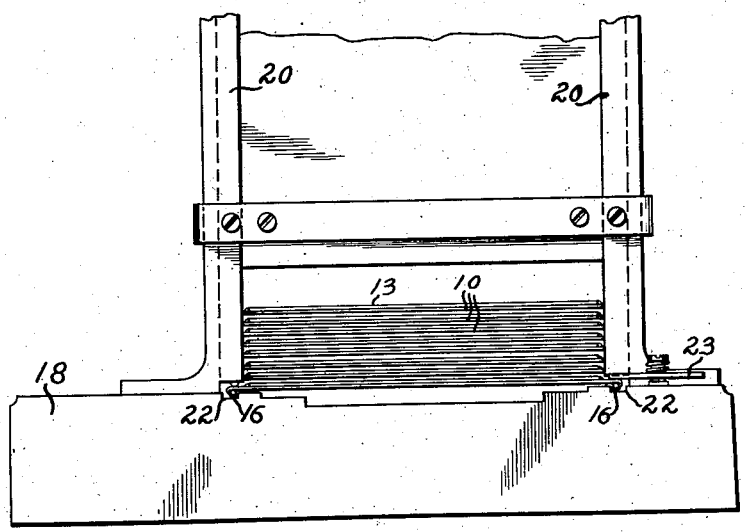
Fig. 2 is an end elevation of a portion of the machine with some of the parts omitted, said view showing particularly how the holders are stacked in the magazine and fed therefrom.
Figure 4:
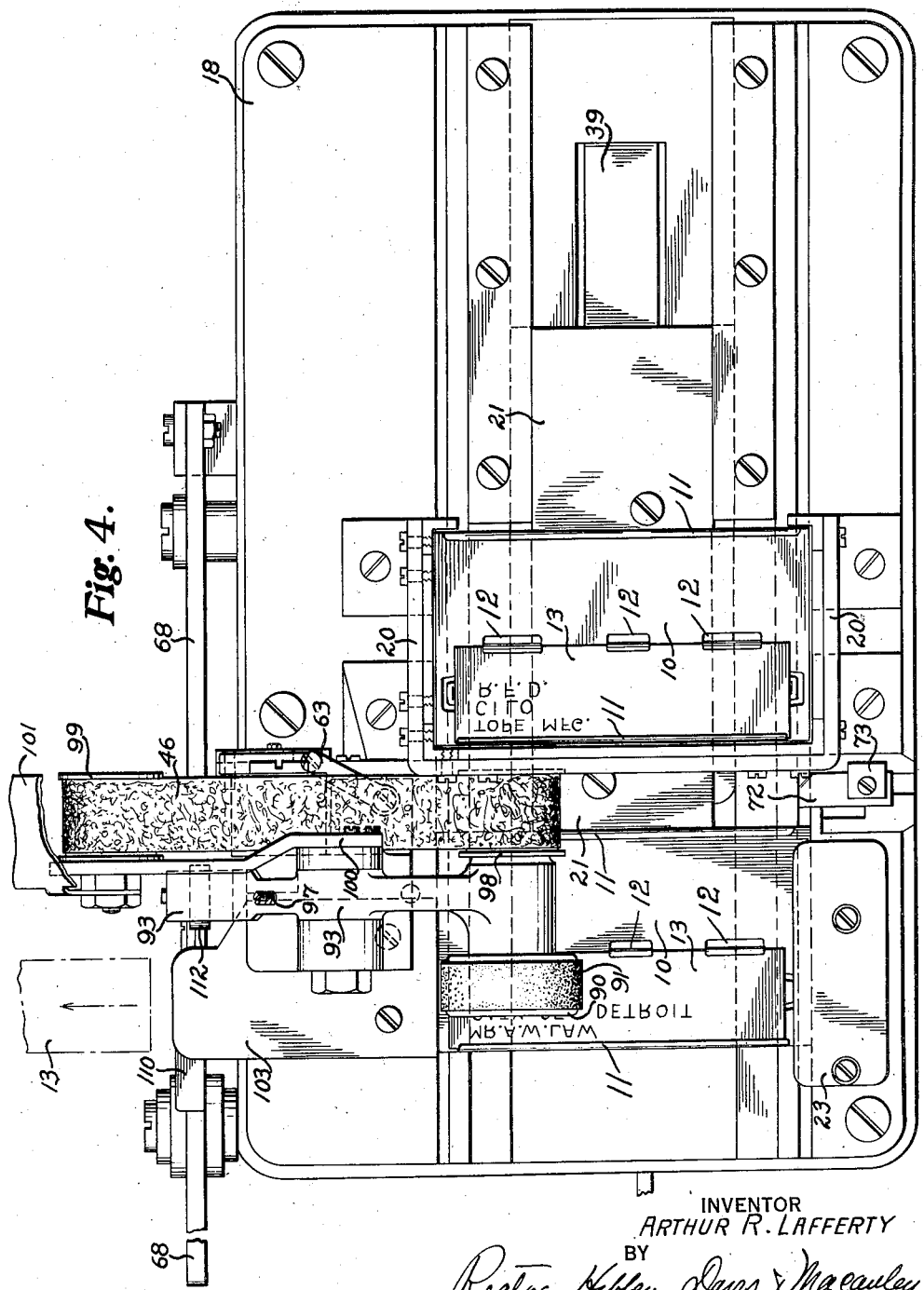
Fig. 4 is a plan view similar to Fig. 3 with the upper parts of the machine included, said view showing a holder fed fully forward to where the plate is ejected from it.

The ejecting machine, which has a frame 17 supporting a base plate 18 (Fig. 5), is provided with a magazine 20 for receiving the holders. This magazine is of rectangular shape as illustrated in Figs. 2 and 4 and it is of such size and height as to loosely receive a substantial stack of holders which are placed in it face up. The front and rear sides of the magazine are open at the bottom so that a feed plate 21 (Fig. 5) can engage the side of the lowermost plate and push it out sidewise from under the stack. The holders are fed out of the magazine one at a time from right to left as viewed in Fig. 5, by means of the sliding feed plate 21 which is given a forward and a return stroke of operation by the machine. As this plate moves forward it pushes the lowest holder out and, in the meantime, holds the stack from descending. As the plate moves back on its return stroke it moves out from under the holders whereupon the stack drops down the thickness of one holder and the feed plate may then move forward again to push the next holder out of the magazine. In this way the holders are fed out of the magazine one at a time by the reciprocating movement of the feed plate.

As each holder is fed from the magazine, the ribs 16 on its bottom slide into grooves 22 in the base plate 18 (Fig. 2). The holder also moves under a spring pressed plate 23 which urges the holder down to maintain its ribs 16 in the grooves 22. This serves to prevent lateral movement and twisting of the holder when the machine operates to slide the plate out of it.

Figure 3:
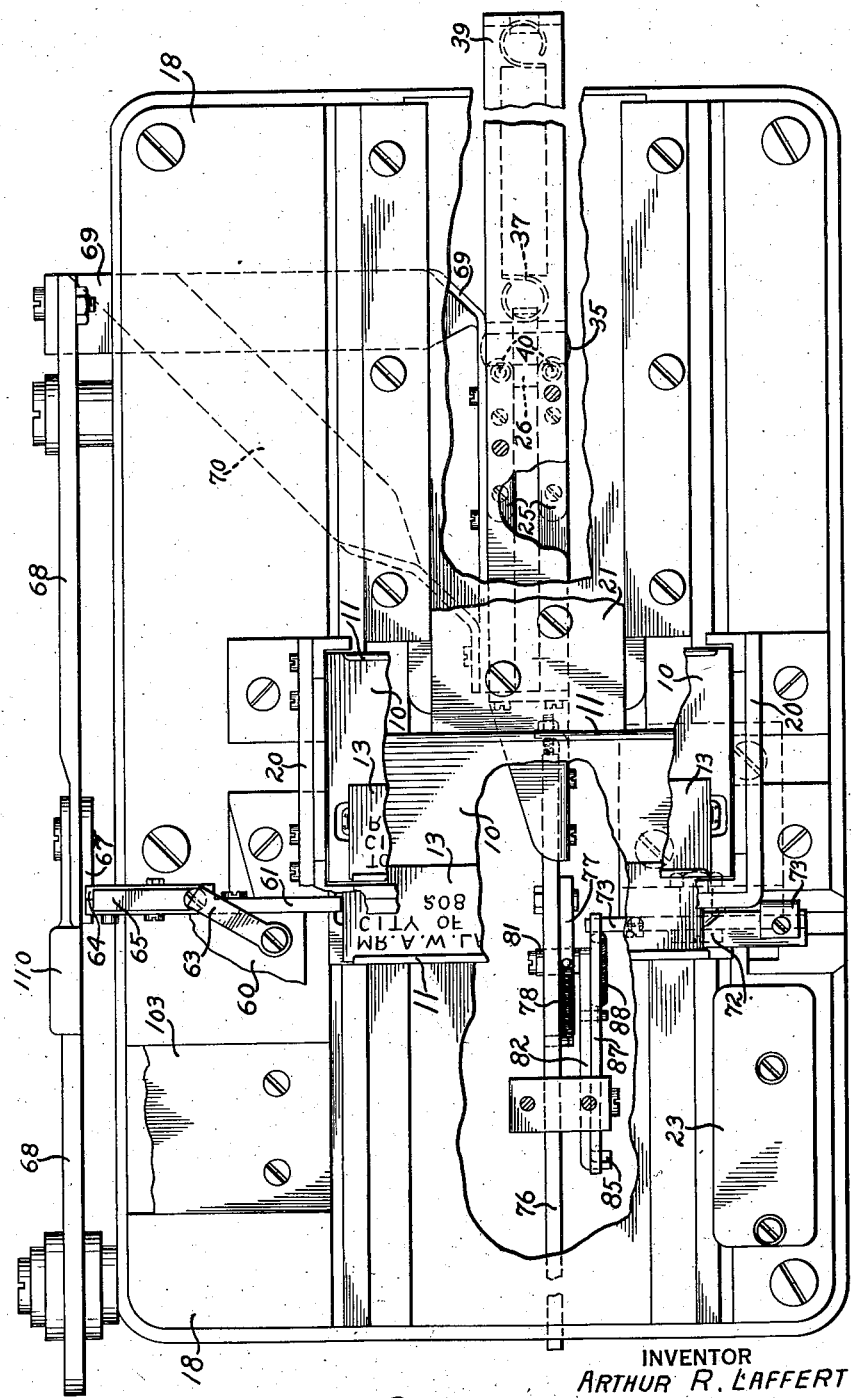
Fig. 3 is a plan view of the machine with one of the holders fed part way out of the magazine, some of the upper parts of the machine being omitted and others broken away to show some of the lower parts more clearly.

The feed plate 21 is reciprocated by means of a general operating slide 25 to which it is fastened by screws, illustrated in Figs. 3 and 6. This slide is, in turn, reciprocated by an arm 26 illustrated in Fig. 6 that is oscillated by a crank arm 27 on a shaft 28 which is rotated as the machine operates. The crank arm 27 has a sliding connection or coupling 29 with the oscillating arm 26 to provide proper relative movement of the parts. The arm 26 is slidably pivoted at its lower end on an adjustable pin 30, the lower end of the arm 26 being bifurcated at 32 to fit over the stud. A spring 33 is connected at one end to the stud 30 and at its other end to a stud 34 on the sliding coupling 29 to prevent chattering of the arm 27 when the shaft 28 is stopped. The upper end of the arm 26 carries a cross pin 35 located in a slot 36 in the general operating slide 25. The normal position of the pin 35 in the slot is illustrated in Fig. 6, to which position the pin and arm 26 are urged by a spring 37 connected at one end to the arm 26 and at its opposite end to a lug 38 on extension 39 of the slide 25. The pin 35 is releasably held against movement in the opposite direction in slot 36 by one or more spring pressed plungers 40, one of which is illustrated in Fig. 6. This plunger is urged upwardly by a spring 41 and it is guided by a bracket fixed to the slide 25. The upper end of the plunger is rounded so that when the pressure on the pin 35 exceeds a predetermined amount the pin will depress the plunger 40 and move in the slot 36, thereby moving relative to the slide 25. The connection between the operating arm 26 and the slide 25 is thus a yielding one and a safety device is provided such that, if any of the mechanism should become blocked, the lever 26 can move relative to the slide 25 before any of the parts are forcibly operated to break them.

Figure 5:
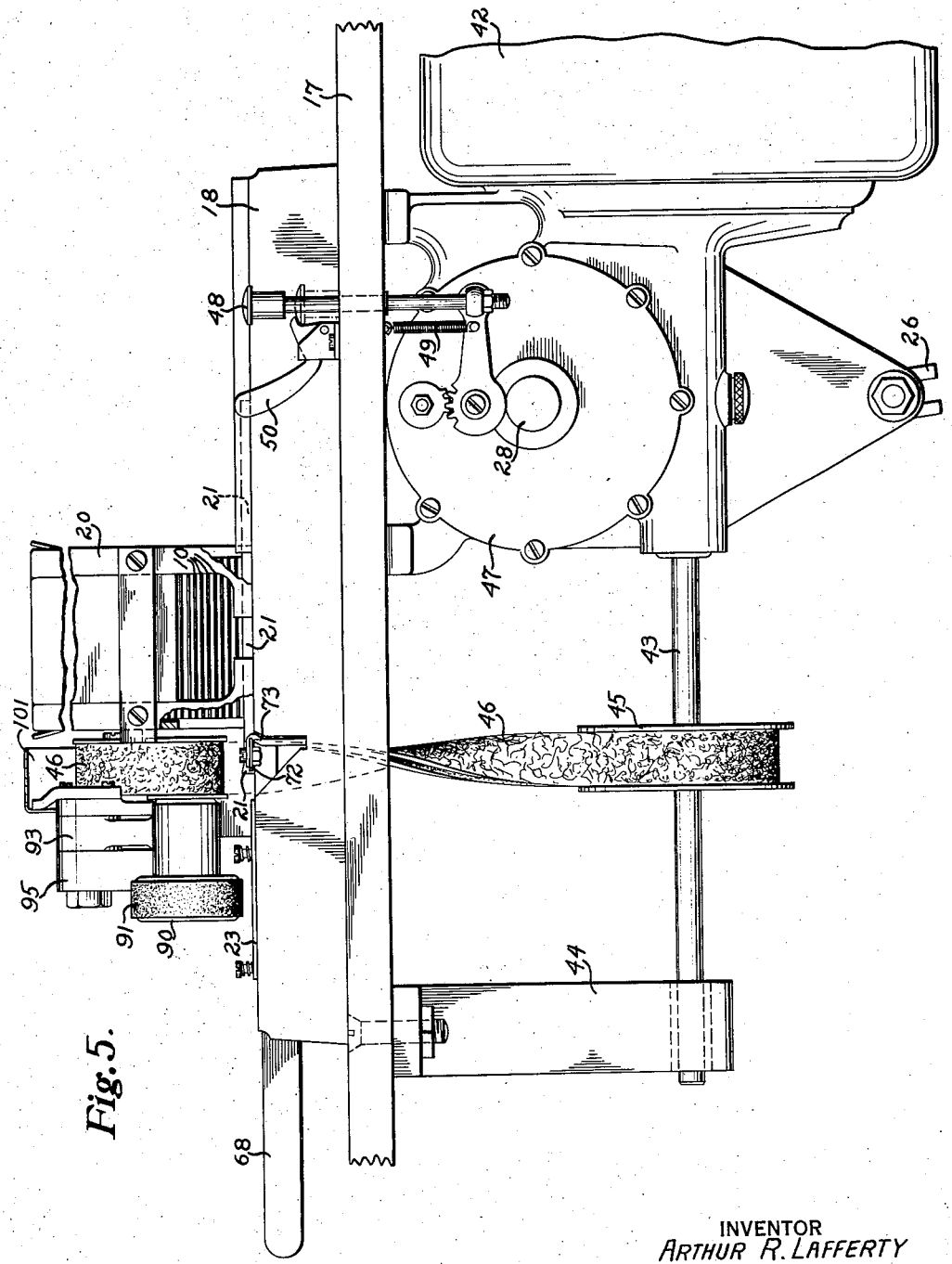
Fig. 5 is a left side elevation of the machine.

The machine is driven by an electric motor 42 illustrated in Fig. 5. One part of the machine is driven continuously by the motor when the latter is running through an extension 43 of the armature shaft, the outer end of such extension being journaled in a bracket 44. This extension carries a pulley 45 that drives a belt 46 suitably connected to certain mechanism of the machine that will be explained later. Another portion of the mechanism is driven by the motor through a clutch contained in the housing 47, said clutch serving to intermittently rotate the shaft 28 heretofore mentioned. The clutch is of the same type as that shown in Vincent's Patent No. 866,750, to which reference is made, the details of the clutch not being important in the present invention.

The clutch is controlled by a depressible controller 48 normally urged upwardly by a spring 49. A latch 50 is provided which engages over the top of the controller to hold it depressed until the latch is manually released. When the controller is depressed, the clutch is engaged and the motor operates to drive the mechanism continuously until the operator manipulates the latch 50 to release the controller, whereupon it rises up under the influence of its spring 49 to disengage the clutch.

The first operation in removing a plate 13 from its holder consists in depressing the spring retaining tongue 14—15 on the discharge end of the holder and in giving the plate a slight initial movement to slide it over the depressed tongue to prevent a return of the tongue to position to block removal of the plate. This operation is accomplished automatically while the holder is being fed out of the magazine and the mechanism for doing it is illustrated most clearly in Figs. 7, 9 and 10.

Pivotally mounted in a boss 60 on the base plate 18 (Fig. 9) is a finger 61 having a downwardly extending nose 62 for engaging the tongue 14 of the holder 10. This finger is urged counter-clockwise by a leaf spring 63 bolted to the boss 60 and bearing on the finger. Pivotally mounted in a slot in the left hand end of the finger 61, as viewed in Fig. 9, is a pawl 64 urged downwardly by a leaf spring 65 which bears on the top of the finger 61. The pawl may be rocked upward against the tension of its spring, but a stud 66 engaging in a slot in the end of the finger 61 limits its upward movement. The pawl is positioned to be engaged by a cam 67 (Fig. 8) adjustably secured to a slide plate 68 which moves with the general operating slide 25, the connection between the slides being shown in Fig. 3 where it will be observed they are connected together by the cross piece 69 and the brace 70. The finger 61 is thus operated by the main slide that also operates the feed plate for feeding the holders out of the magazine. The extent of movement of the finger 61 may be adjusted by means of an adjusting screw 71 which determines the height of the cam and thus controls the throw of the finger. It will be observed that the cam has a sudden rise which is necessary because the finger must move very rapidly to perform its operation instantly in view of the fact that such operation takes place while the holder is moving out of the magazine.

Almost simultaneously and immediately after the finger 61 is rocked down to depress the tongue 14 of the holder 10, a second finger 72 at the right hand side of the machine, as viewed in Fig. 9, is operated to push the plate 13 endwise, or to the left as viewed in Fig. 9, so as to move the plate over the depressed tongue 14 and its projection 15. The plate is moved only slightly, its movement being limited by contact with the end of the finger 61 (Fig. 10), but this movement is sufficient to cause the plate to pass over the tongue 14 so that the tongue cannot rise again when the holder is fed forward past the finger 61. The tongue 72 is carried by a bell crank lever 73 pivoted at 74 and normally urged in a clockwise direction by a spring 75. This bell crank lever is rocked counter-clockwise immediately after and almost simultaneously with the rocking of the finger 61 and this is accomplished by means of mechanism illustrated best in Fig. 7.

The general operating slide 25 carries a forward extension 76 having a pawl 77 pivoted to it which pawl is urged counter-clockwise by a spring 78 connected at one end to the pawl and at the other end to a stud on the extension 76, the pawl being limited in its movement by a stud 79 projecting into a slot 80. The pawl normally occupies the position illustrated in Fig. 7, where it is positioned in the path of a roller 81 on the end of an arm 82 pivoted at 83 to a bracket on the frame plate 18. The arm 82 has a branch 84 provided with a lateral lug 85 engaging the tail 86 of a second arm 87 also pivoted at 83. The two arms 82 and 87 are connected together by a spring 88 and the end of the arm 87 is bent downwardly and positioned to engage one end of the bell crank lever 73 carrying the finger 72.

As the operating slide 25 moves forward to feed one of the holders from the magazine, the pawl 77 engages the roller 81 and rocks the arm 82 clockwise which, through the medium of the spring 88 rocks the arm 87 clockwise and thereby rocks the bell crank lever 73 counter-clockwise as viewed in Fig. 9 to cause the finger 72 to engage the end of the plate 13 in the holder and push the plate to the left (Fig. 10) over the tongue 14 which has been depressed by the finger 61. The end of the finger 72 has a bent up lug 89 to insure that the finger will contact the plate even though the latter may vary slightly in vertical position. After the pawl 77 passes forward over the roller 81, the spring 88 returns the arms 82 and 87 to normal position.

The timing of the operation of finger 72 is such that the address plate 13 is pushed to the left immediately after the finger 61 depresses the tongue 14, and while the tongue is held depressed. This timing may be adjusted by means of the adjusting screw 76ª illustrated in Fig. 7 which may be timed to vary the position of the extension 76 on the operating slide 25 to thereby vary the effective point at which the pawl 77 engages the roller 81. During the return stroke of the operating slide 25 the pawl 77 rides up over the roller and the spring 18 returns the pawl to normal position.

After the plate 13 has been partially removed during the movement of the holder away from the magazine, it is completely removed when the holder reaches the position illustrated in Fig. 4. The final removal of the plate is accomplished by means of a continuously rotating friction roller 90 (Fig. 11) having a friction surface 91 for engaging the address plates 13. This roller is carried by a shaft 92 journaled in an arm 93 pivoted at 94 in a frame bracket 95. The arm 93 is urged in a counter-clockwise direction by a spring 96 so as to normally urge the roller 90 away from the plate 13, the counter-clockwise movement of the arm being limited by an adjustable limit stud 97. The shaft 92 carries a pulley 98 (Fig. 5) over which the driving belt 46 passes. This belt also passes over an idler pulley 99 on an arm 100 secured to the frame bracket 95, which arm also carries a guard plate 101. The belt then passes over the drive pulley 45 and returns over a second idler pulley 102 mounted in a portion of the frame bracket. This pulley and belt arrangement provides a driving means for the friction wheel whose tension is maintained during the different movements of the arm 93 carrying said wheel.

The spring 96 keeps the friction wheel 90 out of engagement with the address plate 13 and in the position illustrated in Fig. 11 during the entire forward feeding stroke of the feed plate 21 but, upon the return stroke of the plate and of the general operating slide 25, the friction roller is moved down into engagement with the address plate as illustrated in dot and dash lines in Fig. 11. The address plate 13 that is in position to be contacted has already been partially removed from its holder 10 by the mechanism heretofore explained. At the time of the engagement of the plate by the friction roller 90, said roller is rotating rapidly and, as it contacts the address plate, it quickly ejects it entirely from the holder and throws it over the guide plate 103 illustrated in Fig. 11 into a suitable receptacle that may be provided. The mechanism for causing the rotating friction roller to engage the address plate is illustrated most clearly in Figs. 11 and 12 and is as follows:

The operating slide 68 carries a pivoted cam 110, which rests on an adjustable stud 111 by means of which the position of the active surface of the cam above the top of the slide may be varied. This cam is located so as to engage a roller 112 on a pass-by pawl 113 pivoted at 114 to one end of the arm 93 carrying the shaft 92 on which the friction roller 90 is journaled. It will be observed that one corner 115 of the pass-by pawl is cut away, as shown in Fig. 12, with the result that, when the operating slide 25 moves forward during the feeding operation, that is, to the right in Fig. 12, the cam 110 simply moves the roller 112 and its pass-by pawl 113 to the dot and dash position illustrated without moving the arm 93. However, upon the return stroke of the general operating slide 25, the cam 110 engages the roller while traveling in the reverse direction, that is, to the left in Fig. 12, which would tend to move the pawl clockwise were it permitted to move in said direction. The pawl cannot move clockwise on its pivot because of the square shoulder on its upper left hand side, and hence the cam 110 lifts the roller 112 to move the arm 93 upward which causes it to be rocked clockwise on its pivot as viewed in Fig. 11 to cause the friction roller 90 to engage the address plate that is beneath it at that time. The extent of movement of the arm 93 is controlled by the adjustment of the cam 110 by means of the stud 111 as heretofore described. In this way the friction roller 90 is caused to momentarily engage the address plate that is beneath it and which has already been partially started out of the holder by the finger heretofore described. The contact is sufficiently long to permit the roller to completely eject the plate from the holder.

*Operation*

All that the operator has to do when using the machine is to stack the holders face up in the magazine and press down on the controller 48.

In the normal condition of the machine, the feed plate 21 is beneath and forward of the stack of plate holders and the main operating slide 25 and its pawl 77 are in the dotted line position shown at the left in Fig. 7. As the machine operates, the slide 25 moves rearward, that is, to the right in Fig. 4, to the left in Fig. 6, to the right in Fig. 7, and to the left in Fig. 12. As the slide moves rearward, or to the right from the left hand dotted line position in Fig. 7, the pawl 77 rides over the roller 81 and moves to the right hand dotted line position without operating the arms 82 and 87. Also, as the main slide 25 moves rearwardly, the slide 68 moves to the left from its Fig. 8 position and the cam 67 acts on pawl 64 to rock the finger 61, the rocking action of the latter being idle in this case because no plate is yet in position. Also, as the main slide 25 moves rearwardly, or to the left in Fig. 12, the cam 110 raises the roller 112 on arm 93 and moves the friction roller 90 to operative position, but here again the operation is idle as no plate is in place.

As the main slide 25 reaches the end of its rearward movement, the feed plate 21 moves out from under the stack of holders and they immediately drop down with the lowest one now in the space formerly occupied by the feed plate. After the direction of the main slide is reversed and as the slide moves forward again, the feed plate engages the lowest holder and moves it forward. As the main slide 25 moves forward, the slide 68 moves to the right from the dotted line position of Fig. 8 and the cam 67 operates the finger 61 to depress the spring tongue 14 of the holder which is moving out of the magazine. Immediately thereafter, and almost simultaneously, the pawl 77 on the extension 76 of slide 25 (Fig. 7) engages the roller 81 as the slide moves to the left in Fig. 7, and the arms 82 and 87 are rocked to rock the finger 72 into engagement with the plate to partially move it out of the holder.

The main slide 25 continues to move forward and the feed plate 21 moves the holder to a position under the roller 90 as shown in Fig. 4. During the forward movement of the slide, which is to the right from the dotted line position in Fig. 12, the cam 110 passes the pass-by pawl 113 and moves to the full line position of Fig. 12.

Upon the return movement of the slide 25, the pawl 110 raises the roller 112 and the pawl 113 with the arm 93, which results in moving the rotating roller 90 into engagement with the partially ejected plate to completely remove it. As the slide 25 returns, the parts operate further as previously described, that is, the pawl 77 (Fig. 7) rides over the roller 81 without operating it and the cam 67 (Fig. 8) operates finger 61, but since there is nothing under the finger, the operation is an idle one.

From the above description it will be clear that a machine has been provided which is entirely automatic. It is merely necessary to stack the holders face up in the magazine and press the controller 48 down to start the machine. The machine feeds one holder at a time out of the magazine and, while it is moving out, the spring retaining tongue holding the address plate is pressed down and immediately the plate is moved slightly out of the holder and over the tongue so that the tongue cannot spring back to holding position. The holder continues moving forward until it is under the friction roller 90 and, as the feed plate 21 moves back to get another holder, the friction roller comes down into engagement with the address plate and throws the plate completely out of the holder. As successive holders are fed out of the magazine, the preceding ones are pushed off of the machine and the above operation is repeated. The timing of the various mechanisms may be adjusted so that each will operate at the proper instant. This timing is related directly with the means for feeding the holders out of the magazine in the machine illustrated, that is, the main operating slide 25, but this need not necessarily be the case.

The operator does not have to pay any attention to the machine other than to feed the holders into the magazine in the right manner. This may be done by putting them in in large quantities, merely being sure that they are face up so that the address plates are on top of the holders as they are fed out of the magazine.

The machine has been illustrated and described as it is applied to removing plates from holders having only one plate in them. These holders sometimes have more than one plate and these plates are sometimes shaped differently than the particular plate shown. It will be understood that, in cases where more plates are used or where they are shaped differently, the embodiment of the invention is modified accordingly by duplicating the ejecting devices or changing their size, shape and location so as to act on the particular type of plates and holder involved. Also, it may, in some cases, be desirable to eject the plates from the holders as they are fed out of another machine in which event the magazine can be dispensed with and the feeding mechanism can be arranged to feed the holders directly to the ejecting devices, it being understood that the embodiment of the invention shown herein is for purposes of illustration only and that many variations may be made in it without departing from the spirit and scope of the invention as defined by the appended claims.

I claim:

1. In a machine of the class described, a magazine for receiving holders having removable plates, means for automatically feeding the holders from the magazine, and means for automatically removing the plates from the holders that are fed from the magazine.

2. In a machine of the class described, a magazine for receiving holders having removable plates, means for automatically feeding the holders from the magazine, automatic means for first partially removing the plates from the holders that are fed from the magazine, and automatic means for subsequently completely removing the plates.

3. In a machine of the class described, a magazine for receiving holders having removable plates, means for feeding the holders from the magazine, automatic means for partly removing the plate from a holder as it is fed from the magazine, and means acting automatically to subsequently complete the removal of the plate.

4. In a machine of the class described, a magazine for receiving holders having removable plates, an automatic feeding means having a forward and a return stroke of movement for feeding the holders from the magazine, automatic means acting during the forward stroke of the feeding means for partially removing the plate from a holder that is fed out of the magazine, and automatic means for completing the removal of the plate from said holder during the return stroke of the feeding means.

5. In a machine of the class described, a magazine for receiving holders having removable plates, automatic means for feeding the holders from the magazine, automatic means for removing the plate from a holder that is fed from the magazine, and means controlled by the feeding means for timing the action of the removing means in removing the plate from the holder.

6. In a machine of the class described, a magazine for receiving holders having removable plates, means for feeding the holders from the magazine, means for partially removing the plates from a holder that is fed from the magazine, means for completing the removal of the plate from said holder, and means controlled by the feeding means for timing the action of the means for partially removing and the means for completely removing the plate from the holder.

7. In a machine of the class described, a magazine for receiving a plurality of holders having plates held in them by depressible projections, means for automatically feeding the holders from the magazine, and means for automatically depressing one of the projections and removing the plate from each of the holders that is fed from the magazine.

8. In a machine of the class described, a magazine for receiving holders having plates held in them by depressible projections, means for automatically feeding the holders from the magazine, means for depressing one of the projections and partially removing the plate from each of the holders fed from the magazine, and automatic means for subsequently completing the removal of the plates.

9. In a machine of the class described, a magazine for receiving holders having plates held in them by depressible projections, means for automatically feeding the holders from the magazine, means for automatically depressing one of the projections on each of the holders fed from the magazine, automatic means acting simultaneously with the depressing means for partially removing the plate from each holder, and automatic means acting subsequently to complete the removal of the plate.

10. In a machine of the class described, a magazine for receiving holders having removable plates held in them by depressible projections, means for automatically feeding the holders from the magazine, means acting automatically to depress one of the projections of a holder and to partially remove the plate from said holder while it is being fed from the magazine, and means acting subsequently to automatically complete the removal of the plate from said holder.

11. In a machine of the class described, a magazine for receiving holders having removable plates held in them by depressible projections, a feeding means having a forward and return stroke of movement for feeding the holders from the magazine, means controlled by the forward movement of the feeding means for automatically depressing a projection of the said holder and partially removing the plate from it, and means acting automatically and timed by the return movement of the feeding means for completing the removal of the said holder.

12. In a machine of the class described, a magazine for receiving holders having removable plates, a reciprocating slide having a feed plate for feeding holders from said magazine, automatic means for removing the plates from each of the holders fed from the magazine, and cams carried by the reciprocating slide for controlling the action of the automatic removing means.

13. In a machine of the class described, a magazine for receiving holders having removable plates, a reciprocating slide having a feed plate for feeding holders from said magazine, automatic means for first partially removing a plate from each holder fed from the magazine, a second automatic means for completely removing the plates from said holders, cams carried by said slide for actuating the first automatic means, and a cam carried by said slide for controlling the action of the second automatic means.

14. In a machine of the class described, a magazine for receiving holders having removable plates held in them by depressible projections, a reciprocating slide having a feed plate for feeding the holders from the magazine, automatic means for depressing one of the projections and partially removing the plate from each of the holders fed from the magazine, a second automatic means for completely removing the plates from said holders, cams carried by said slide for actuating said first automatic means, and a cam carried by said slide for controlling the action of the second automatic means.

15. In a machine of the class described, a magazine for receiving holders having removable plates held in them by depressible projections, a reciprocating slide operating a feed plate for feeding holders from said magazine, means actuated by said slide during its feeding movement for depressing one of the projections in each of the holders fed from the magazine and partially removing the plate therefrom, and a second automatic means controlled by the slide during its return movement for completely removing the plate from said holder.

16. In a machine of the class described, a magazine for receiving holders having removable plates held in them by depressible projections, a reciprocating slide operating a feed plate for feeding the holders from said magazine, a pivoted finger for depressing one of the projections in each of the holders fed from the magazine, a second pivoted finger for moving the plate over the depressed projection, cams carried by said slide for operating said fingers, a continuously rotating friction wheel for completing the removal of the plates from the holder, and a cam carried by said slide for moving said friction roller into contact with the plate.

17. In a machine of the class described, a magazine for receiving holders having removable plates held in them by depressible projections, a slide having a forward and a return stroke of movement, a feed plate operated by said slide for feeding holders from said magazine, a pivoted finger for depressing one of the projections of each of the holders fed from said magazine, a second pivoted finger for partially removing the plate from said holder and moving it over the depressed projection, cams carried by said slide for operating said fingers during the forward feeding movement of the feed plate, a pivoted arm carrying a continuously rotating friction roller for completing the removal of the plates from the holders, and a cam carried by said slide for moving said arm to move said roller into position to contact the plates during the return movement of the slide.

18. In a machine of the class described, a magazine for receiving holders having removable address plates in them, means for feeding the holders from the magazine, and means for removing the plates from the holders.

19. A mechanism for ejecting address plates from the holders in which they are held, comprising a feeding mechanism for feeding the holders to a position to permit their plates to be acted upon, and means for removing the plates from the holders.

20. A mechanism for ejecting address plates from holders in which they are normally held by a retaining means, comprising means for feeding the holders to a position to permit them to be acted upon, means for releasing the retaining means, and means for ejecting the plates after the retaining means is released.

21. Mechanism for ejecting address plates from the holders in which they are normally held by retaining means, comprising means for releasing said retaining means and means for ejecting said plates after the retaining means is released.

22. Mechanism for ejecting address plates from holders in which they are held by spring retaining means, comprising means for releasing said spring retaining means, means for moving said plates in the holders to a position to prevent said retaining means from returning to its normal plate-retaining position, and mechanism for ejecting the partially moved plates.

In testimony whereof, I have subscribed my name.

ARTHUR R. LAFFERTY.